(12) United States Patent
Charles et al.

(10) Patent No.: US 8,807,479 B2
(45) Date of Patent: Aug. 19, 2014

(54) MOVABLE BUSHING INTERFACE AND TAXI DRIVE SYSTEM

(75) Inventors: David Lane Charles, South Bend, IN (US); Douglas Wise, Berrien Springs, MI (US); Donald Jeffrey Christensen, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 13/418,251

(22) Filed: Mar. 12, 2012

(65) Prior Publication Data
US 2013/0233969 A1 Sep. 12, 2013

(51) Int. Cl.
*B64C 25/32* (2006.01)

(52) U.S. Cl.
USPC .......................................... 244/103 R; 244/50

(58) Field of Classification Search
USPC ................................ 244/103 R, 50, 103 S, 51
See application file for complete search history.

(56) References Cited

U.S. PATENT DOCUMENTS

| | | | |
|---|---|---|---|
| 2,732,088 A | 1/1956 | Arnot | |
| 2,843,237 A | 7/1958 | Carr | |
| 2,869,662 A | 1/1959 | Koup | |
| 3,089,557 A | 5/1963 | Davis et al. | |
| 7,252,266 B2 | 8/2007 | Tebon | |
| 7,726,455 B2 | 6/2010 | Benoit et al. | |
| 8,528,856 B2* | 9/2013 | Charles et al. | 244/50 |
| 8,617,019 B2* | 12/2013 | Christensen et al. | 475/154 |
| 2011/0297786 A1* | 12/2011 | Sweet et al. | 244/103 R |
| 2013/0062466 A1* | 3/2013 | Sweet et al. | 244/103 R |
| 2013/0200210 A1* | 8/2013 | Oswald et al. | 244/50 |
| 2013/0284854 A1* | 10/2013 | Charles et al. | 244/50 |

* cited by examiner

*Primary Examiner* — Christopher P Ellis
(74) *Attorney, Agent, or Firm* — Shimokaji & Associates, P.C.

(57) ABSTRACT

A drive ring may be configured to receive a drive key from a wheel rim in a bushing on the ring. The bushing may include a slot with clearance to allow movement of the drive key within the slot during axial or rim flexure events. The axial or rim flexure events may occur for example, during taxiing of a vehicle and the loads of the vehicle can impart flexure forces on the connection between the wheel rim and the drive system. In one exemplary embodiment, the bushing may be movable on the drive ring to accommodate movement of the drive key during flexure.

20 Claims, 9 Drawing Sheets

MOVABLE BUSHING INTERFACE AND TAXI DRIVE SYSTEM

BACKGROUND OF THE INVENTION

The present invention generally relates to taxi drive systems and more particularly, a movable bushing interface.

Existing designs for electric taxi systems (ETS) for aircraft may require a solid connection between the wheel rim or drive key and a drive element of an electric taxi actuator. This solid connection may adversely impact the structural integrity of the wheel rim. For example, during taxiing, the load of the aircraft may cause the wheel to ovalize on each revolution. Moreover, the loads exerted on the wheel may cause deflections of the wheel rim with respect to the axle. For example, weight on the axle during a turn may cause flexure of the wheel rim radially or axially from the drive element as the drive element may not want to flex with the load forces.

The combination of wheel ovalization and axial deflections caused by wheel side load conditions and axle bending may compromise the structural integrity in the interface between the ETS drive and the wheel. For example, point loading of forces on the drive element may lead to wear issues over time, expediting failure of the connection between the ETS and the wheel.

Referring to FIGS. 1A-1C, the effects of loads on a conventional wheel to wheel drive system connection 100 can be seen. FIG. 1A shows a wheel 110 connected to a drive ring 150 with minimal loads affecting the connection 100 which can be seen for example, during braking or at a standstill. FIG. 1B shows both wheel rim deflection and axle deflection of the wheel 110 from the drive ring 150. As shown in FIG. 1C, rim flexure may be approximately ±12.5 mm and axle flexure may be approximately ±8 mm. In a conventional wheel to wheel drive system connection 100, flexure in either direction may be a source of lost torque during taxi operations.

A wheel drive key (not shown) may sometimes be employed to connect wheel 110 to the drive ring 150. The wheel drive key's typical primary purpose is to drive the brake rotors (not shown) and provide the interface that decelerates the wheel 110 during aircraft braking. This same key may be used by the ETS system (not shown) as the input for the torque that is used to rotate the aircraft wheel 110 during electric taxi operations and ground maneuvers.

As can be seen, there is a need for an interface in the taxi drive system that can accommodate axial deflections and ovalization in the connection of the drive system to the wheel during operation.

SUMMARY OF THE INVENTION

In one aspect of the present invention, a drive ring comprises a circular body; a set of gear teeth radially extending from the body; a support portion extending axially from the body; a first set of walls defining a channel in the support portion; and a bushing including a second set of walls defining a slot configured to receive a drive key attached to a wheel rim.

In another aspect of the present invention, a taxi drive interface system includes a drive ring including one or more channels in the ring; a bushing disposed in one of the channels, the bushing including walls defining a slot; a wheel rim; and a drive key mounted on the wheel rim, disposed in the slot.

In still yet another aspect of the present invention, a taxi drive interface system includes a drive ring gear including a plurality of flange mounts around the ring; a plurality of bushings disposed amongst the plurality of flange mounts, the bushings each including walls defining a slot; a wheel rim; and a plurality of drive keys mounted on the wheel rim, disposed amongst the slots of the plurality of bushings.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, embodiments of the present invention generally provide an apparatus and system to accommodate deflection of a wheel on an axle. Aspects of the subject technology may be useful in aircraft landing gear systems during taxi of the aircraft.

Aspects of the present invention may utilize an accommodating interface on the output of an ETS drive ring that is positioned around the end of a wheel drive key. The ETS drive ring is typically connected to a motor gear box. The interface is configured to receive the wheel drive key so that loading forces from the key are distributed within the interface.

In one exemplary embodiment, the drive key may be removably inserted into the drive ring. The drive key may be adapted to fit within a corresponding slot in the drive ring with an amount of predetermined latitude to account for flexure yet maintain torque delivery to the wheel. However, in another exemplary embodiment, the use of a movable interface to provide the torque input to the wheel from the ETS system (not shown) allows the wheel to ovalize and flex axially as the aircraft is rolling and performing turning operations while maintaining the requisite torque with little or no impact on the existing wheel. This interface will allow the wheel to experience the same or lower loading forces as it normally experiences during a braking event.

Aspects of the subject technology will also allow the aircraft maintenance personnel to remove the wheel and tire assembly from the aircraft for tire changes without removing any additional equipment or disconnecting any interfaces associated with the electric taxi system.

Figure 1B:
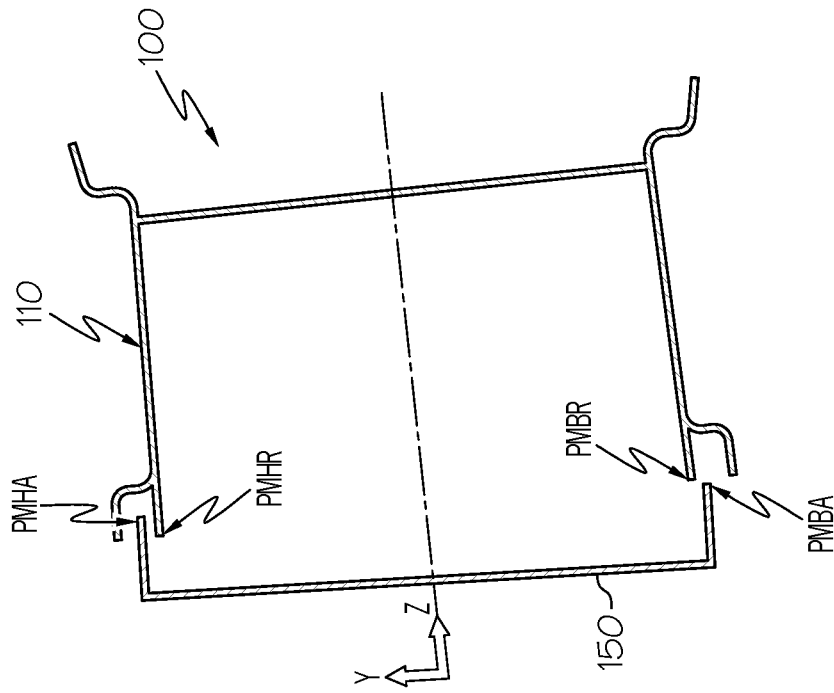
FIG. 1B is a schematic illustration showing a deformed connection between a wheel rim and a drive system in the prior art.
Figure 1A:
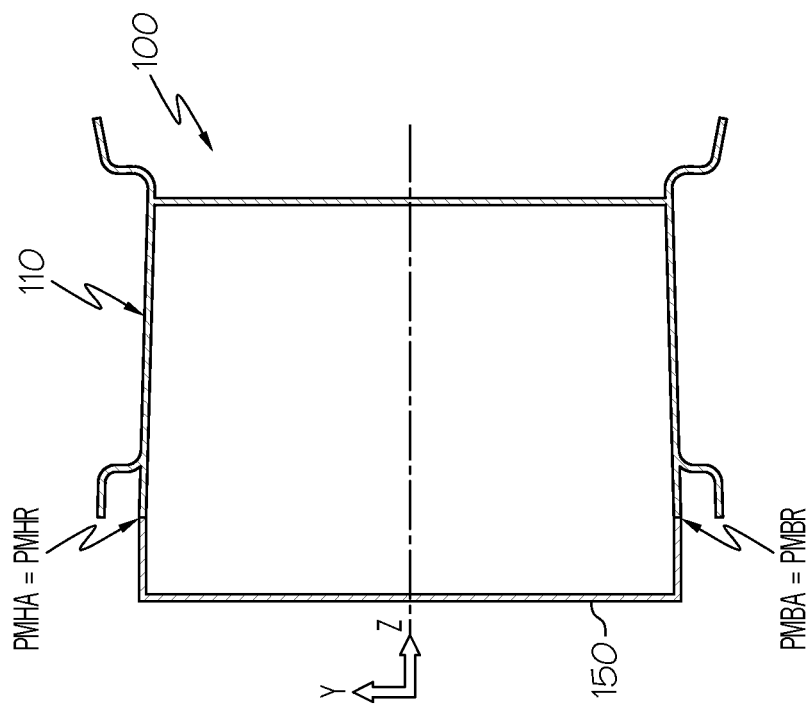
FIG. 1A is a schematic illustration showing an un-deformed connection between a wheel rim and a drive system in the prior art.
Figure 1C:
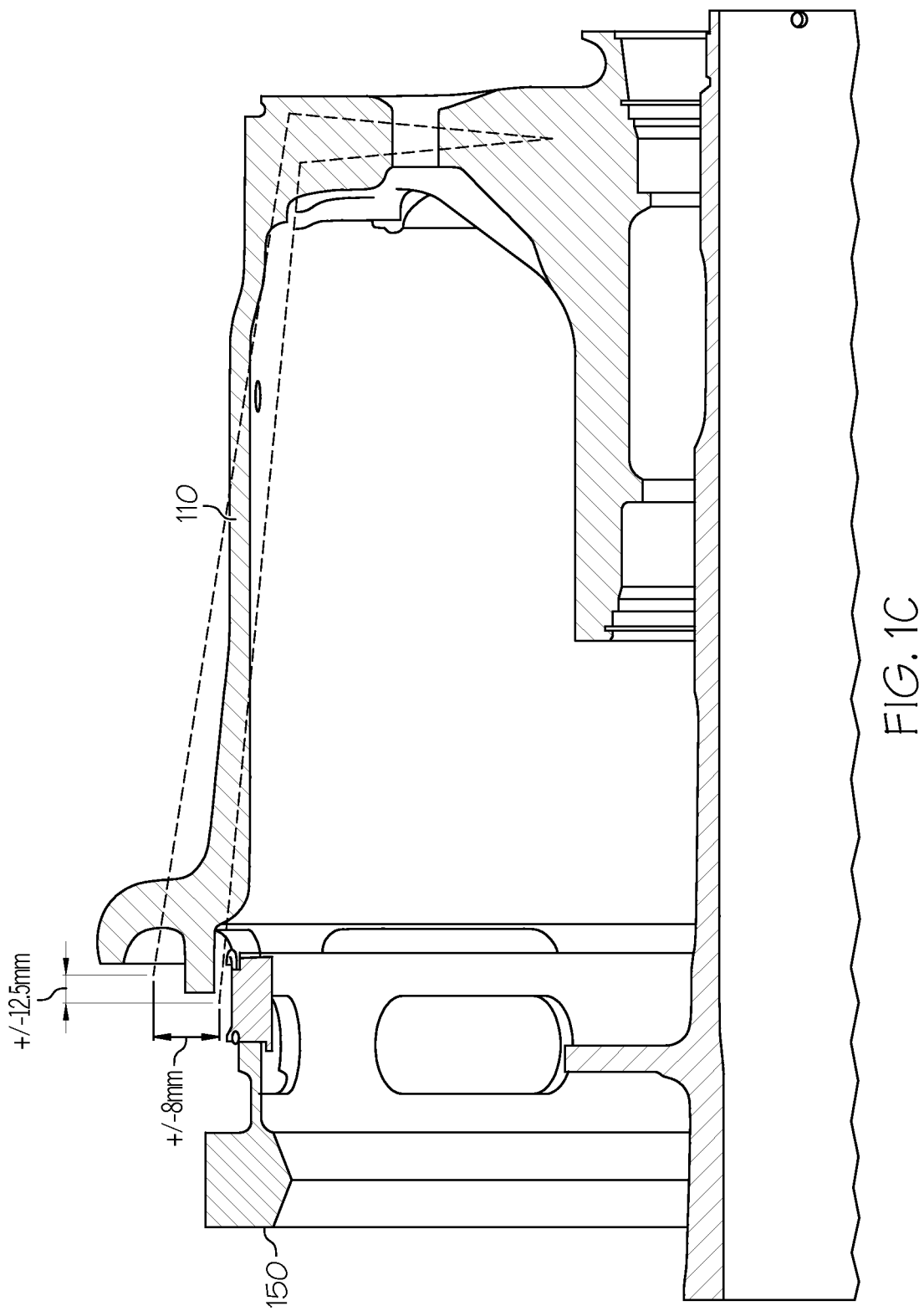
FIG. 1C is a cross-sectional side view of a wheel rim connected to a drive system with exemplary flexure measurements.
Figure 2:
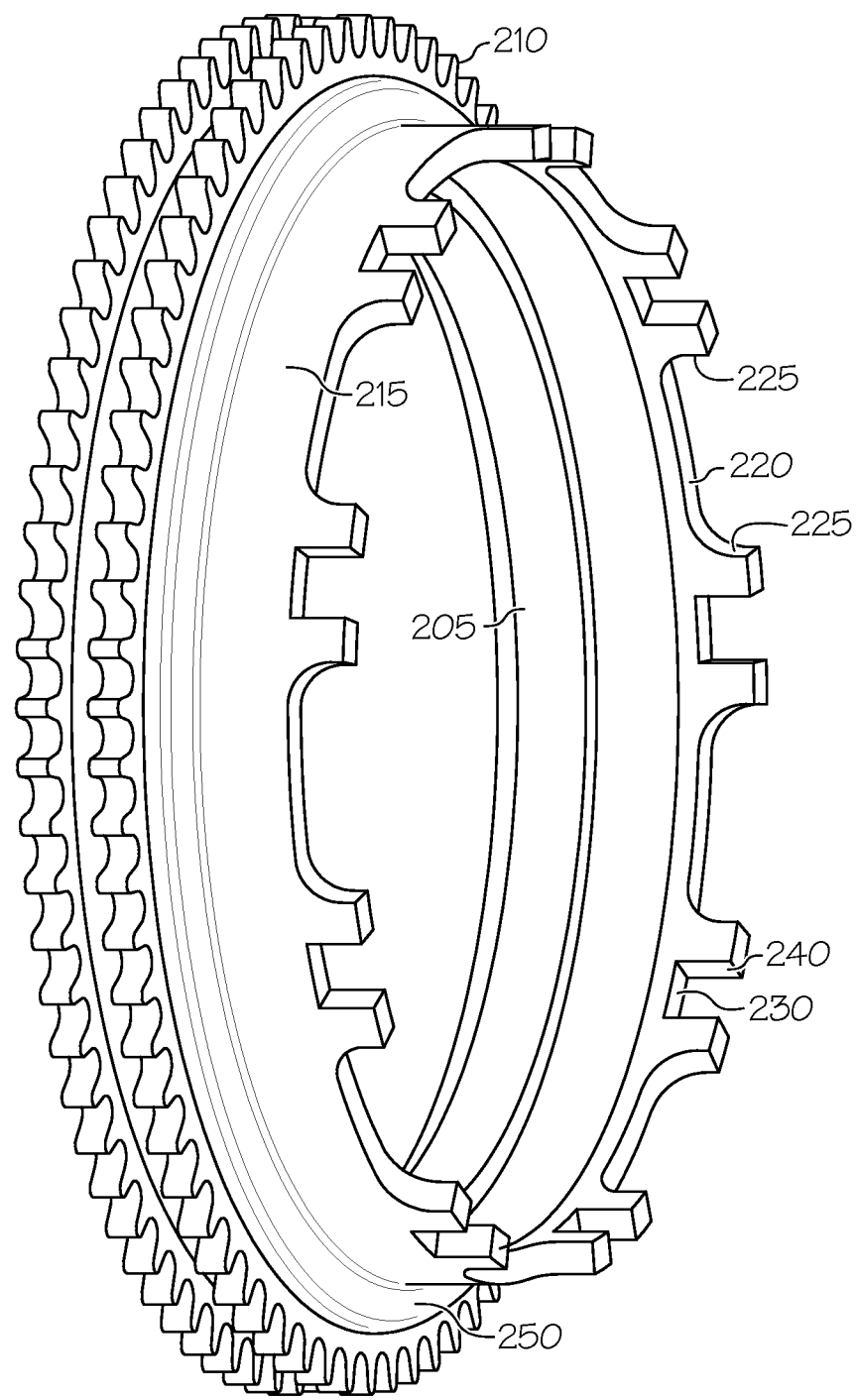
FIG. 2 is a perspective side view of a drive ring according to an exemplary embodiment of the present invention.
Figure 2A:
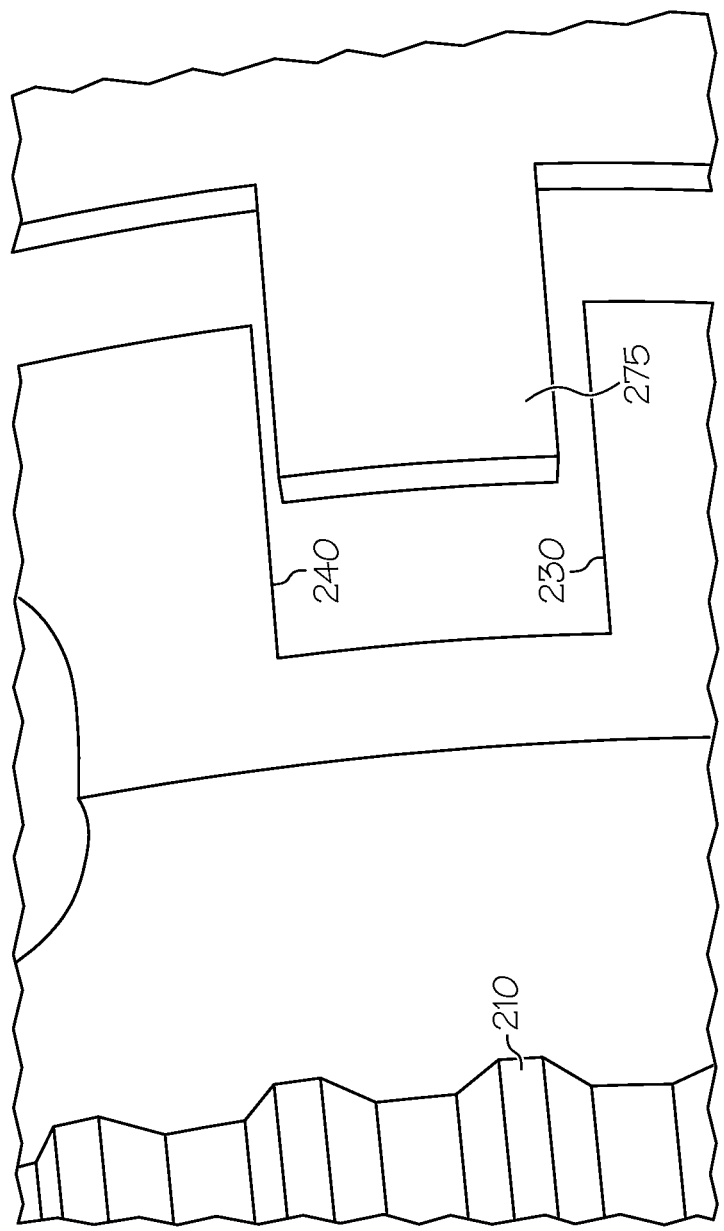
FIG. 2A is an enlarged view of a drive key connected to the drive ring of FIG. 2.

Referring now to FIGS. 2 and 2A, a drive ring 250 is shown according to an exemplary embodiment of the present invention. The drive ring 250 may include a circular body 205. A set of gear teeth 210 may extend radially from the body 205. A support portion 215 may extend axially from the body 205. A channel 230 in the support portion 215 may be defined by walls 240 extending from the support portion 215. The drive ring 250 may include one or more of these sets of walls 240 so that a plurality of channels 230 may be present. The channel 230 may be disposed on the drive ring 250 to receive a drive key 275. The drive key 275 may typically be shaped rectangular. The channel 230 may be shaped to accommodate the drive key 275 so that load forces from the drive ring 250 are transferred to the drive key 275. For example, the channel 230 may in one exemplary embodiment, include straight walls 240. It my also be noted that the channel 230 may include a predetermined amount of play between the walls 240 and the drive key 275. Thus, flexure in the wheel rim (not shown) or axle (not shown) may be accommodated as the drive key 275 may have room to move when in contact with the walls 240 and torque forces may still be transferred. In another aspect, the drive ring 250 may also include a weight reducing and cooling scallop 220 in the support portion 215. The scallop 220 may provide reduced weight on the drive ring 250 while also providing a medium for cooling fluid flow during operation.

Figure 3:
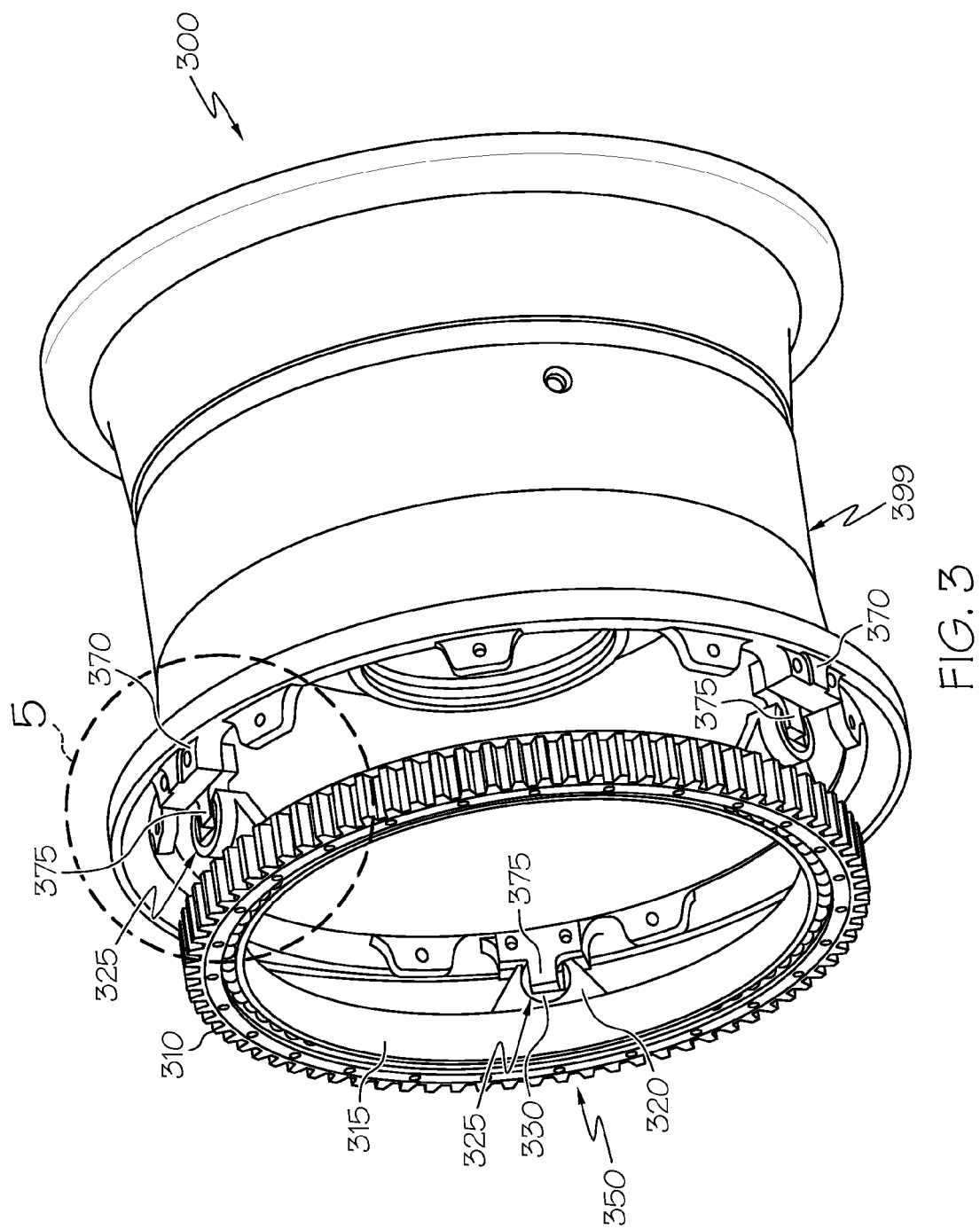
FIG. 3 is a perspective side view of a taxi drive interface system according to another exemplary embodiment of the present invention.
Figure 4:
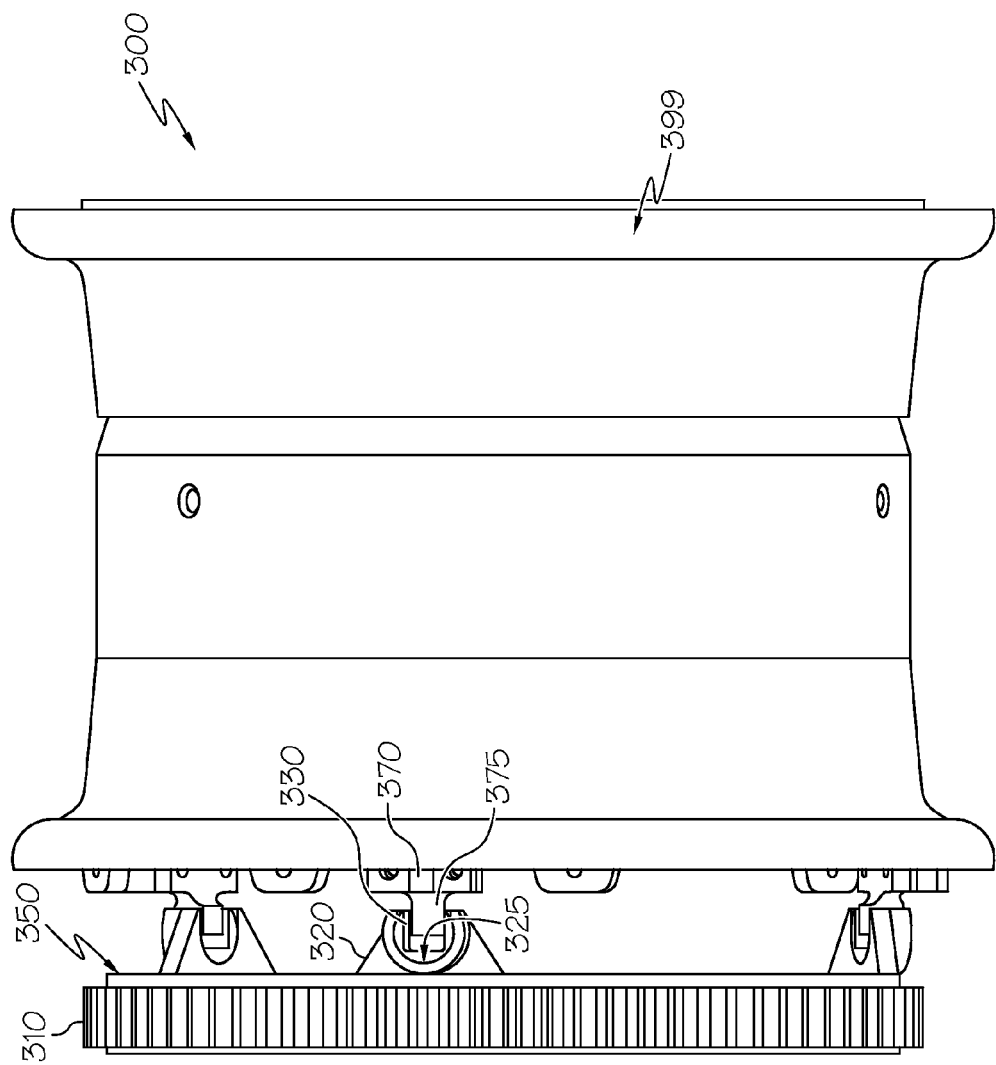
FIG. 4 is a side view of the taxi drive interface system of FIG. 3.
Figure 5:
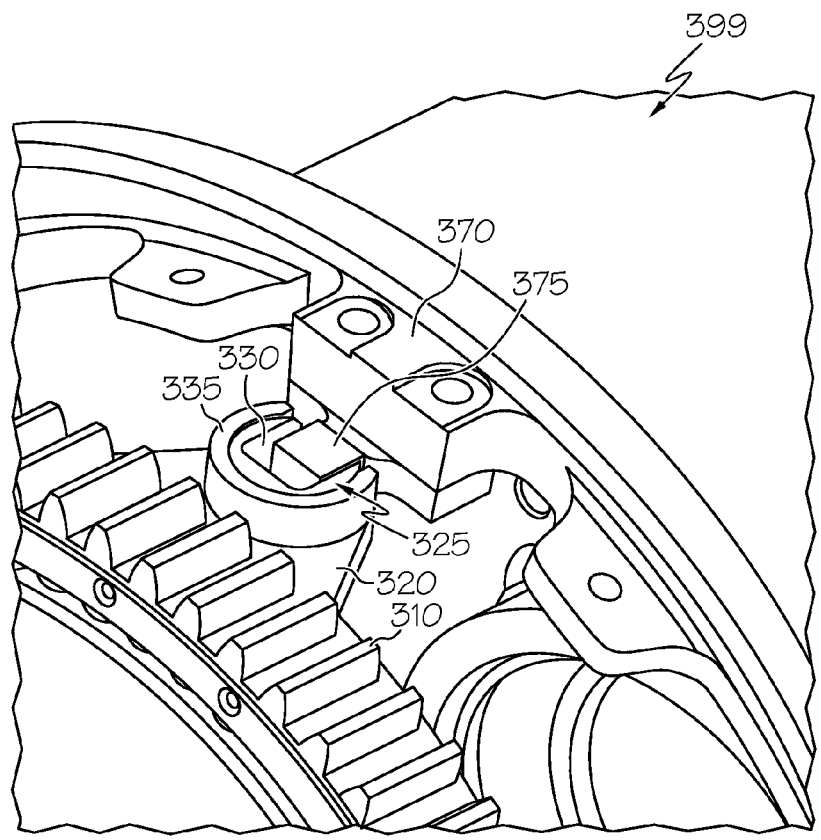
FIG. 5 is an enlarged view of the circle 5 of FIG. 3.
Figure 6:
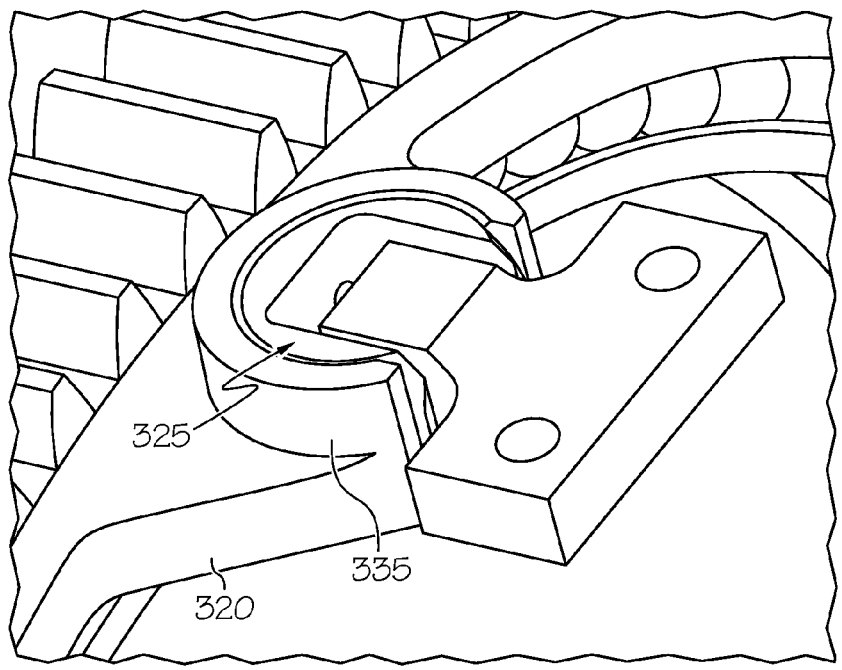
FIG. 6 is an enlarged view of a drive key received within a bushing used in the system of FIG. 3.
Figure 7:
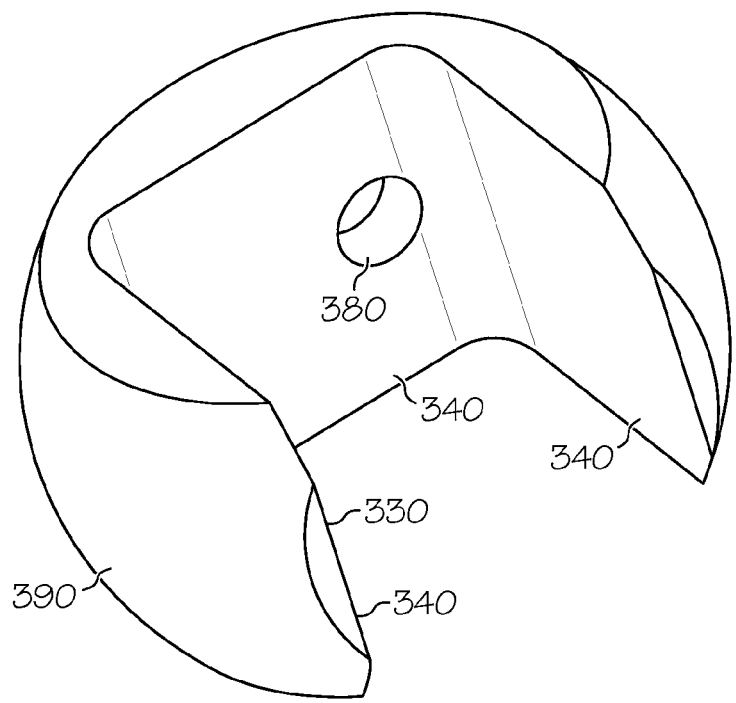
FIG. 7 is an enlarged perspective front view of a bushing according to an exemplary embodiment of the present invention.
Figure 8:
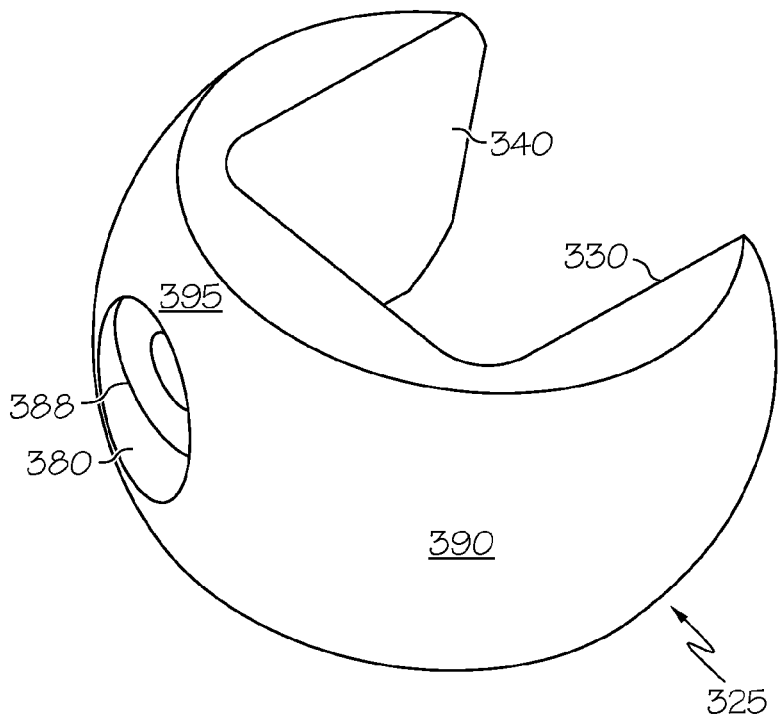
FIG. 8 is an enlarged perspective rear view of the bushing of FIG. 7.
Figure 9:
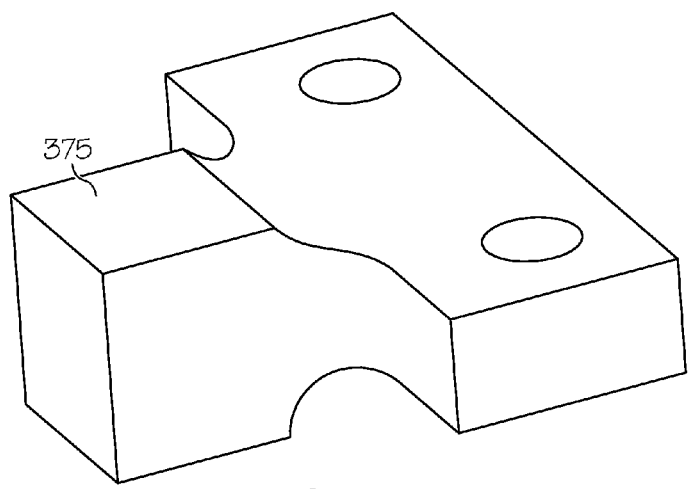
FIG. 9 is an enlarged perspective side view of a drive key used in the system of FIG. 3.
Figure 10:
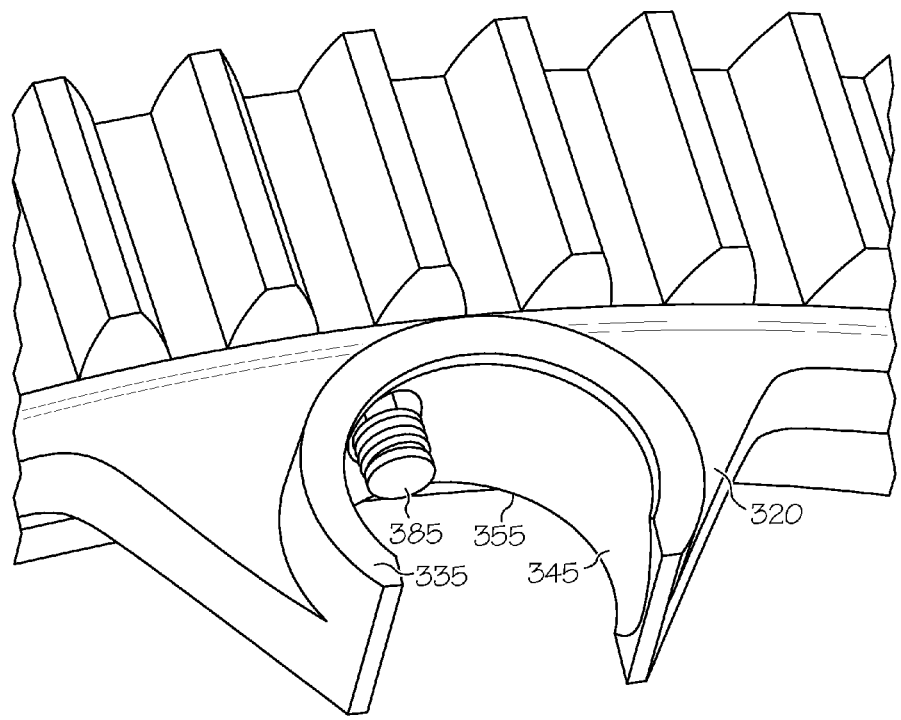
FIG. 10 is an enlarged perspective top view of a flange mount used in the system of FIG. 3.

Referring now to FIGS. 3-4, a taxi drive interface system 300 is shown according to another exemplary embodiment of the present invention. The taxi drive interface system 300 may include in general, a drive ring gear 350 and a wheel rim 399. The wheel rim 399 may include on an end, a mount 370 and a drive key 375 coupled to the mount 370. The drive ring gear 350 may include gear teeth 310 and a flange 320 extending from a gear body 315. The flange 320 may extend axially from the gear body 315. A bushing 325 may be positioned within the flange 320. The bushing 325 may be open-faced defining a slot 330 therein so that it is disposed to receive the drive key 375.

Referring now to FIGS. 5-10, details of the bushing 325 and the flange 320 are shown. In one aspect, the thickness of the bushing 325 may be approximately that of the drive key 375. The flange 320 may include a lug 335 protruding upward therefrom. The bushing 325 may be semi-spherical and may include internal walls 340 defining a slot 330. The bushing 325 being semi-spherical may allow slot 330 to align with multiple angular orientations of drive key 375. The depth of the slot 330 may depend on the size of the drive key 375. The internal walls 340 may be configured to be long enough to receive the entire length of the drive key 375 and may further include an additional amount of clearance. Thus, the depth of the slot 330 may be greater than the length of the drive key 375. The bushing 325 may also include a thickness that is approximately a thickness of the flange 320 and lug 335 combined. The slot 330 may have clearance and depth adequate to prevent binding due to wheel deflections. Thus, the drive key 375 may be surrounded in the channel 330 so that loads from the drive key 375 may be distributed in balance within the walls 340.

In another aspect, the bushing 325 may be configured to move and rotate within the flange 320. The flange 320 may include a spherical inner wall 345 defining a channel 355. A detent button 385 may protrude from the inner wall 345 into the channel 355. The detent button 385 may be off-center along the inner wall 345. The bushing 325 may include a spherical outer surface 390. The curvature of the outer surface 390 may correspond to the curvature of the inner wall 345. Thus in one aspect, the bushing 325 may be configured to rotate and pivot three dimensionally about the detent button 385 within the inner wall 345 in a manner similar to a gyroscope.

In an exemplary assembly of the busing 325 to the flange 320, the bushing 325 may be inserted sideways (for example, 90 degrees from the plane of the flange mount 320) into the channel 355, turned and rotated until an access hole 380 in a rear section 395 of the bushing 325 encounters the detent button 385. The access hole 380 may be surrounded by a depression wall 388. The diameter of the access hole 380 may be larger than the diameter of the detent button 385 providing clearance for the bushing 325 to move within the channel 355. This clearance may be adequate to allow the bushing 325 to follow the drive key 375 without causing a bind. In the event the bushing 325 needs removing, the depression wall 388 provides clearance for bushing 325 to be slid off the detent button 385.

Referring again to FIG. 4, in an exemplary operation of the taxi drive interface system 300, load forces from the drive key 375 may be more evenly distributed within the bushing 325 as compared to, for example, forces distributed within the channel 230 of drive ring 250 (FIG. 2). For example, during flexure, the deflection forces may move the drive key 375 to engage the internal walls 340. The thickness of the bushing 325 and the depth of the walls 340 may maintain the drive key 375 within the slot 330 while the bushing 325 rotates within the flange 320 to accommodate movement of the drive key 375 along lines of deflection.

It should be understood, of course, that the foregoing relates to exemplary embodiments of the invention and that modifications may be made without departing from the spirit and scope of the invention as set forth in the following claims. For example, while the foregoing was described primarily in the context of a single drive key received within a bushing in a drive ring, it will be understood that multiple drive keys may be included on the wheel rim and multiple bushings may be included on the drive rings in accordance with exemplary embodiments of the present invention. In addition, other elements described as being present on the wheel and drive ring above may also be included in plural form, such as, flanges and mounts. Moreover, exemplary embodiments employing multiple bushings may benefit from improved load distribution around the drive ring as the loads from multiple drive keys may be balanced around the gear.

We claim:

1. A taxi drive interface system comprising:
   a drive ring;
   a circular body;
   a set of teeth radially extending from the body;

a support portion extending axially from the body;
a first set of walls defining a channel in the support portion; and
a bushing in the channel, the bushing including a second set of walls defining a slot configured to receive a drive key attached to a wheel rim.

2. The taxi drive interface system of claim 1 wherein the first set of walls is rounded and the bushing includes a spherical outer surface adapted to rotate within the channel.

3. The taxi drive interface system of claim 2 further comprising a detent in the first set of walls and a hole in the bushing disposed to receive the detent.

4. The taxi drive interface system of claim 3 wherein the detent is positioned off-center along the first set of walls.

5. The taxi drive interface system of claim 2 wherein the depth of the slot is greater than a length of the drive key.

6. A taxi drive interface system, comprising:
a drive ring including one or more channels in the ring;
a bushing disposed in one of the channels, the bushing including walls defining a slot;
a wheel rim; and
a drive key mounted on the wheel rim, disposed in the slot.

7. The taxi drive interface system of claim 6 wherein the bushing is configured to pivot within the channel.

8. The taxi drive interface system of claim 6 wherein the bushing includes a spherical outer surface adapted to rotate within the channel.

9. The taxi drive interface system of claim 8 wherein the channel is rounded.

10. The taxi drive interface system of claim 8 further comprising a button detent in the channel and a hole in the bushing disposed to receive the detent.

11. The taxi drive interface system of claim 10 wherein the bushing is configured to move three dimensionally about the button detent.

12. The taxi drive interface system of claim 6 wherein the depth of the slot is greater than a length of the drive key.

13. A taxi drive interface system, comprising:
a drive ring including a plurality of flanges around the ring;
a plurality of bushings disposed amongst the plurality of flanges, the bushings each including walls defining a slot;
a wheel rim; and
a plurality of drive keys mounted on the wheel rim, disposed amongst the slots of the plurality of bushings.

14. The taxi drive interface system of claim 13 wherein the flanges include a s inner wall and the plurality of bushings are configured to rotate within the inner wall.

15. The taxi drive interface system of claim 14 wherein the bushings are semi-spherical and configured to move gyroscopically within the flanges.

16. The taxi drive interface system of claim 14 wherein the bushings include a spherical outer surface.

17. The taxi drive interface system of claim 14 wherein the depth of the slot of respective bushings is greater than a length of respective drive keys.

18. The taxi drive interface system of claim 14 further comprising a detent on the inner wall and a hole in a rear section of the bushing disposed to receive the detent.

19. The taxi drive interface system of claim 18 wherein the detent is off-center along the inner wall.

20. The taxi drive interface system of claim 18 wherein the bushing includes a depression wall surrounding the hole.

* * * * *